（12）United States Patent
Sindhushayana et al.

(10) Patent No.: US 7,209,517 B2
(45) Date of Patent: Apr. 24, 2007

(54) METHOD AND APPARATUS FOR ESTIMATING A MAXIMUM RATE OF DATA AND FOR ESTIMATING POWER REQUIRED FOR TRANSMISSION OF DATA AT A RATE OF DATA IN A COMMUNICATION SYSTEM

(75) Inventors: Nagabhushana Sindhushayana, San Diego, CA (US); Peter J. Black, San Diego, CA (US); Rashid Ahmed Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 581 days.

(21) Appl. No.: 10/090,712

(22) Filed: Mar. 4, 2002

(65) Prior Publication Data

US 2003/0165190 A1    Sep. 4, 2003

(51) Int. Cl.
*H04B 3/46* (2006.01)
*H04B 17/00* (2006.01)

(52) U.S. Cl. ........................... 375/225; 455/522
(58) Field of Classification Search ............... 375/222, 375/225; 370/252–443; 455/522
See application file for complete search history.

(56) References Cited

U.S. PATENT DOCUMENTS

| | | |
|---|---|---|
| 4,901,307 A | 2/1990 | Gilhousen et al. |
| 5,056,109 A | 10/1991 | Gilhousen et al. |
| 5,103,459 A | 4/1992 | Gilhousen et al. |
| 5,224,105 A * | 6/1993 | Higley ........................ 714/748 |
| 5,504,773 A | 4/1996 | Padovani et al. |
| 6,144,861 A * | 11/2000 | Sundelin et al. ............ 455/522 |

(Continued)

FOREIGN PATENT DOCUMENTS

WO        01/52425 A2        7/2001

(Continued)

OTHER PUBLICATIONS

C. Lee, "Capacity and Variable Data Rate for Wireless Communications," Signals, Systems and Computers, 1994, Conference Record of the Twenty-Eighth Asilomar Conference on Pacific Grove, California, U.S.A., Oct. 31, 1994, pp. 89-93.

*Primary Examiner*—Jay K. Patel
*Assistant Examiner*—Curtis B. Odom
(74) *Attorney, Agent, or Firm*—Thomas R. Rouse; Thien T. Nguyen; Pavel Kalousek

(57) ABSTRACT

Methods and apparatus for estimating maximum rate of data and for estimating a transmission power required for transmission of a data with a rate of data in a communication system are disclosed. A terminal determines a quality metric of a communication link, over which data are to be transmitted, and modifies the determined quality metric by a quality metric margin. The terminal then estimates the maximum rate of data in accordance with the modified quality metric. Alternatively, the terminal then estimates transmission power required for transmission of a data with a rate of data in accordance with the rate of data and the modified quality metric. The quality metric margin may be a pre-determined or dynamically adjusted. The terminal dynamically adjusts the quality metric margin in accordance with a result of comparison of a transmit power corresponding to the estimated maximum rate of data with an actual transmit power used to transmit the data.

54 Claims, 10 Drawing Sheets

U.S. PATENT DOCUMENTS

| | | |
|---|---|---|
| 6,229,795 B1 | 5/2001 | Pankaj et al. |
| 6,414,948 B1* | 7/2002 | Sato .......................... 370/335 |
| 6,493,541 B1* | 12/2002 | Gunnarsson et al. .......... 455/69 |
| 6,594,501 B2* | 7/2003 | Black et al. ................. 455/522 |
| 6,647,058 B1* | 11/2003 | Bremer et al. ............... 375/222 |
| 6,940,824 B2* | 9/2005 | Shibutani .................... 370/252 |
| 2002/0181550 A1* | 12/2002 | Zeira et al. ................. 375/146 |
| 2002/0196766 A1* | 12/2002 | Hwang et al. .............. 370/342 |

FOREIGN PATENT DOCUMENTS

| | | |
|---|---|---|
| WO | 01/93471 A1 | 12/2001 |
| WO | 02/01762 A1 | 1/2002 |
| WO | 02/09311 A2 | 1/2002 |

* cited by examiner

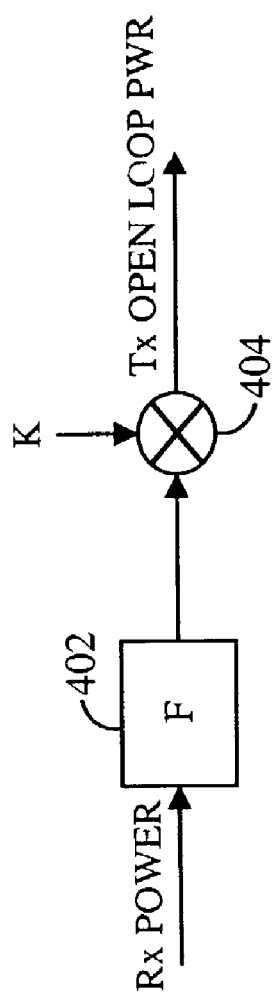
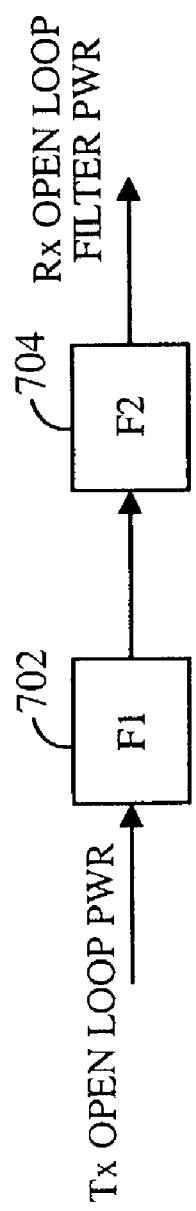

METHOD AND APPARATUS FOR ESTIMATING A MAXIMUM RATE OF DATA AND FOR ESTIMATING POWER REQUIRED FOR TRANSMISSION OF DATA AT A RATE OF DATA IN A COMMUNICATION SYSTEM

BACKGROUND

1. Field

The present invention relates generally to communication systems, and more specifically to a method and an apparatus for estimating a reverse link maximum data rate and for estimating power required for transmission of data at a rate of data in a communication system.

2. Background

Communication systems have been developed to allow transmission of information signals from an origination station to a physically distinct destination station. In transmitting an information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier wave is confined within the communication channel bandwidth. At the destination station the original information signal is reconstructed from the modulated carrier wave received over the communication channel. In general, such a reconstruction is achieved by using an inverse of the modulation process employed by the origination station.

Modulation also facilitates multiple access, i.e., simultaneous transmission and/or reception, of several signals over a common communication channel. Multiple access communication systems often include a plurality of remote subscriber units requiring intermittent service of relatively short duration rather than continuous access to the common communication channel. Several multiple-access techniques are known in the art, such as Time Division Multiple Access (TDMA) and Frequency Division Multiple Access (FDMA). Another type of multiple access technique is a Code Division Multiple Access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

In a multiple access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one mobile subscriber station and a second user on a landline station. A base station receives the data from the user on a reverse link, and routes the data through a Public Switched Telephone Network (PSTN) to the second user. In many communication systems, e.g., IS-95, W-CDMA, IS-2000, the forward link and the reverse link are allocated separate frequencies.

An example of a data only communication system is a High Data Rate (HDR) communication system that conforms to the TIA/EIA/IS-856 industry standard, hereinafter referred to as the IS-856 standard. This HDR system is based on a communication system disclosed in co-pending application Ser. No. 08/963,386, entitled "METHOD AND APPARATUS FOR HIGH RATE PACKET DATA TRANSMISSION," filed Nov. 3, 1997, now U.S. Pat. No. 6,574,211, issued Jun. 3, 2003 to Padovani et al., assigned to the assignee of the present invention. The HDR communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems.

In a wireless communication system, maximizing a capacity of the communication system in terms of the number of simultaneous telephone calls that can be handled is extremely important. The capacity in a spread spectrum communication system can be maximized if the transmission power of each subscriber station is controlled such that each transmitted signal arrives at a base station receiver at the same signal level. However, if a signal transmitted by a subscriber station arrives at the base station receiver at a power level that is too low, quality communications cannot be achieved due to interference from the other subscriber stations. On the other hand, if the subscriber station transmitted signal is at a power level that is too high when received at the base station, communication with this particular subscriber station is acceptable but this high power signal acts as interference to other subscriber stations. This interference may adversely affect communications with other subscriber stations. Therefore, each subscriber station needs to transmit the minimum signal level expressed as e.g., a signal-to-noise ratio, that allows transmitted data recovery.

Consequently, the transmission power of each subscriber station within the coverage area of a base station is controlled by the base station to produce the same nominal received signal power or a signal to noise ratio at the base station. In an ideal case, the total signal power received at the base station is equal to the nominal power received from each subscriber station multiplied by the number of subscriber stations transmitting within the coverage area of the base station plus the power received at the base station from subscriber stations in the coverage area of neighboring base stations.

The path loss in the radio channel can be characterized by two separate phenomena: average path loss and fading. The forward link, from the base station to the subscriber station, operates on a different frequency than the reverse link, from the subscriber station to the base station. However, because the forward link and reverse link frequencies are within the same general frequency band, a significant correlation between the average path losses of the two links exists. On the other hand, fading is an independent phenomenon for the forward link and reverse link and varies as a function of time.

In an exemplary CDMA system, each subscriber station estimates the path loss of the forward link based on the total power at the input to the subscriber station. The total power is the sum of the power from all base stations operating on the same frequency assignment as perceived by the subscriber station. From the estimate of the average forward link path loss, the subscriber station sets the transmit level of the reverse link signal. This type of an open loop control is advantageous when there is a correlation between a forward link and a reverse link. Should the reverse link channel for one subscriber station suddenly improve compared to the forward link channel for the same subscriber station due to independent fading of the two channels, the signal as received at the base station from this subscriber station would increase in power. This increase in power causes additional interference to all signals sharing the same frequency assignment. Thus a rapid response of the subscriber station transmit power to the sudden improvement in the channel would improve system performance. Therefore, it is necessary to have the base station continually contribute to the power control mechanism of the subscriber station. Such a power control mechanism relies on a feedback, also referred to as a closed loop.

Each base station with which the subscriber station is in communication measures the received signal strength from the subscriber station. The measured signal strength is compared to a desired signal strength level for that particular subscriber station. A power adjustment command is generated by each base station and sent to the subscriber station on the forward link. In response to the base station power adjustment command, the subscriber station increases or decreases the subscriber station transmit power by a predetermined amount. By this method, a rapid response to a change in the channel is effected and the average system performance is improved. Note that in a typical cellular system, the base stations are not intimately connected and each base station in the system is unaware of the power level at which the other base stations receive the subscriber station's signal.

When a subscriber station is in communication with more than one base station, power adjustment commands are provided from each base station. The subscriber station acts upon these multiple base station power adjustment commands to avoid transmit power levels that may adversely interfere with other subscriber station communications and yet provide sufficient power to support communication from the subscriber station to at least one of the base stations. This power control mechanism is accomplished by having the subscriber station increase its transmit signal level only if every base station with which the subscriber station is in communication requests an increase in power level. The subscriber station decreases its transmit signal level if any base station with which the subscriber station is in communication requests that the power be decreased. A system for base station and subscriber station power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the Assignee of the present invention.

There is a relationship between a transmission power and a rate of data to be transmitted. Communication systems, in general, do not allow an instantaneous change of rate of data. If a transmission channel link condition changes, resulting in a need to change a transmission power and a data rate during the interval when a rate of data cannot be changed, the transmitted data may be erased. Therefore, there is a need in the art to estimate a rate of data that can be transmitted without an erasure under all channel conditions, or alternatively to estimate power required for transmission of data at a rate of data.

SUMMARY

In one aspect of the invention, the above-stated needs are addressed by determining at a source of data a quality metric of a link over which data is to be transmitted and modifying said quality metric by a quality metric margin. The maximum rate of data is then determined in accordance with said modified quality metric. Alternatively, power required for transmission of data at a rate of data is determined in accordance with said modified quality metric and a rate of the data.

In another aspect of the invention, the quality metric is modified by a pre-determined quality metric margin. Alternatively, modifying said quality metric by a quality metric margin is achieved by declaring an outage event when power required for transmission of a second reference signal exceeds power required for transmission of the second reference signal determined from previously modified quality metric; detecting occurrence of the outage event during a pre-determined interval; and modifying said quality metric in accordance with said detecting.

In another aspect of the invention, the outage is detected by determining at a source of data a quality metric of a link over which data is to be transmitted; modifying said quality metric by a quality metric margin; and declaring an outage event when power required for transmission of a reference signal exceeds power required for transmission of the reference signal determined from the modified quality metric. Alternatively, the outage is detected by determining at a source of data a quality metric of a link over which data is to be transmitted; modifying said quality metric by a quality metric margin; determining a maximum rate of data in accordance with said modified quality metric; and declaring an outage event when power required for transmission of data at the maximum rate of data exceeds maximum allowable transmission power.

BRIEF DESCRIPTION OF THE DRAWINGS

FIG. 4 illustrates a reverse link quality estimator;

FIG. 7 illustrates a predictor;

DETAILED DESCRIPTION

Definitions

Figure 1:
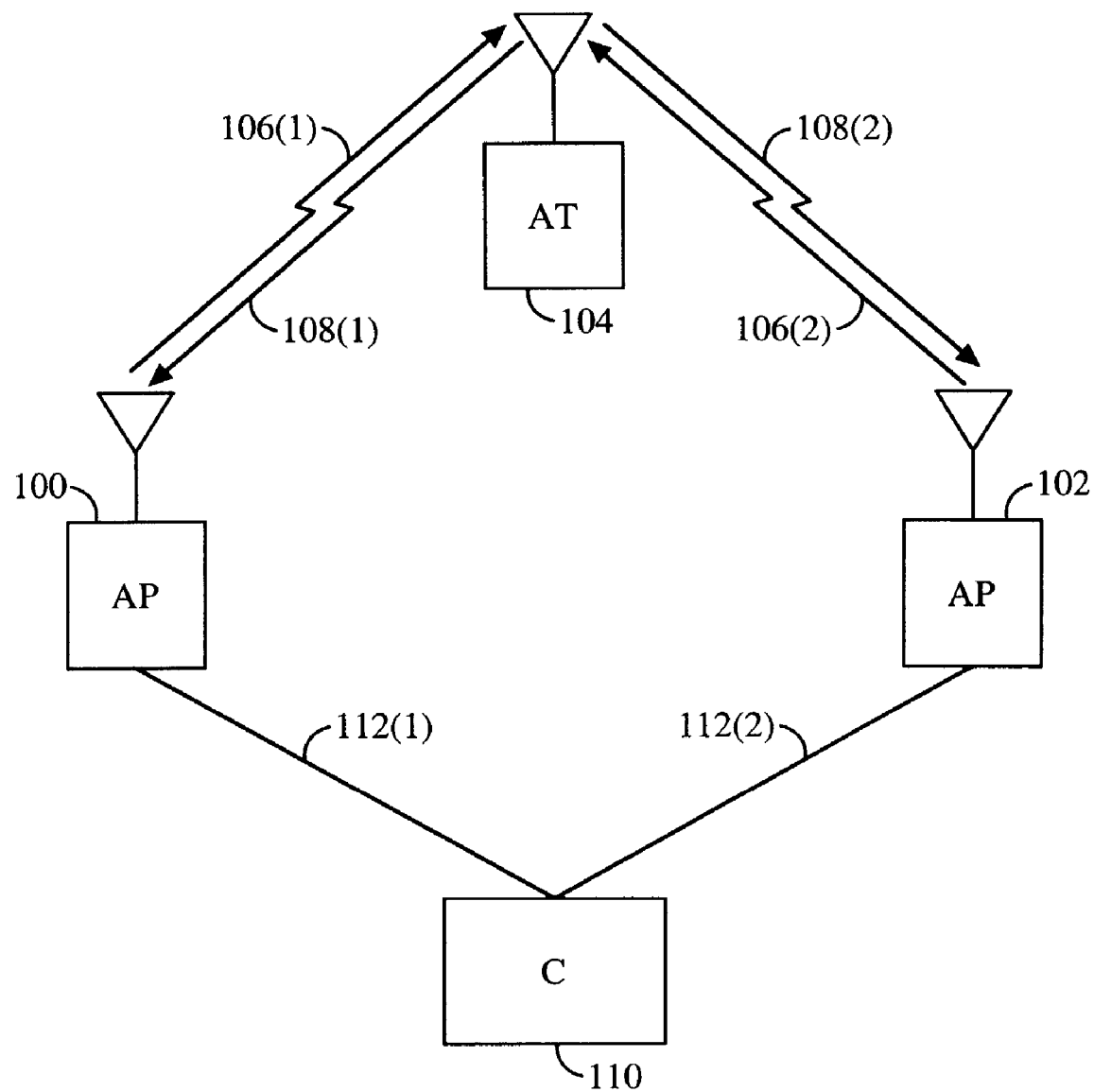
FIG. 1 illustrates a conceptual diagram of an HDR communication system.

The word "exemplary" is used exclusively herein to mean "serving as an example, instance, or illustration." Any embodiment described herein as "exemplary" is not necessarily to be construed as preferred or advantageous over other embodiments.

The term access network is used exclusively herein to mean a collection of access points (AP) and one or more access point controllers. The access network transports data packets between multiple access terminals (AT). The access network may be further connected to additional networks outside the access network, such as a corporate intranet or the Internet, and may transport data packets between each access terminal and such outside networks.

The term base station, referred to herein as an AP in the case of an HDR communication system, is used exclusively herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station, referred to herein as an AT in the case of an HDR communication system, is used exclusively herein to mean the hardware with which an access network communicates. An AT may be mobile or stationary. An AT may be any data device that communicates through a wireless channel or through a wired channel, for example using fiber optic or coaxial cables. An AT may further be any of a number of types of devices including but not limited to PC card, compact flash, external or internal modem, or wireless or wireline phone. An AT that is in the process of establishing an active traffic channel connection with an AP is said to be in a connection setup state. An AT that has established an active traffic channel connection with an AP is called an active AT, and is said to be in a traffic state.

The term communication channel/link is used exclusively herein to mean a single route over which a signal is transmitted described in terms of modulation characteristics and coding, or a single route within the protocol layers of either the AP or the AT.

The term reverse channel/link is used exclusively herein to mean a communication channel/link through which the AT sends signals to the AP.

A forward channel/link is used exclusively herein to mean a communication channel/link through which an AP sends signals to an AT.

The term soft hand-off is used exclusively herein to mean a communication between a subscriber station and two or more sectors, wherein each sector belongs to a different cell. In the context of IS-95 standard, the reverse link communication is received by both sectors, and the forward link communication is simultaneously carried on the two or more sectors' forward links. In the context of the IS-856 standard, data transmission on the forward link is non-simultaneously carried out between one of the two or more sectors and the AT.

The term erasure is used exclusively herein to mean failure to recognize a message.

The term outage is used exclusively herein to mean a time interval during which the likelihood that a subscriber station will receive service is reduced.

Description

FIG. 1 illustrates a conceptual diagram of a communication system capable of performing maximum rate of data estimation in accordance with embodiments of the present invention. Various aspects of the maximum rate of data estimation will be described in the context of a CDMA communications system, specifically a communication system in accordance with the IS-856 standard. However, those of ordinary skill in the art will appreciate that the aspects of the maximum rate of data estimation are likewise suitable for use in various other communications environments. Accordingly, any reference to a CDMA communications system is intended only to illustrate the inventive aspects of the present invention, with the understanding that such inventive aspects have a wide range of applications.

In the above-mentioned communication system, an AP 100 transmits data to an AT 104 over a forward link 106(1), and receives data from the AT 104 over a reverse link 108(1). Similarly, an AP 102 transmits data to the AT 104 over a forward link 106(2), and receives data from the AT 104 over a reverse link 108(2). In accordance with one embodiment, data transmission on the forward link occurs from one AP to one AT at or near the maximum data rate that can be supported by the forward link and the communication system. Other channels of the forward link, e.g., control channel, may be transmitted from multiple APs to one AT. Reverse link data communication may occur from one AT to one or more APs. The AP 100 and the AP 102 are connected to a controller 110 over backhauls 112(1) and 112(2). The term backhaul is used to mean a communication link between a controller and an AP. Although only two AT's and one AP are shown in FIG. 1, one of ordinary skill in the art recognizes that this is for pedagogical purposes only, and the communication system can comprise plurality of AT's and AP's.

Initially, the AT 104 and one of the AP's, e.g., the AP 100, establish a communication link using a predetermined access procedure. In this connected state, the AT 104 is able to receive data and control messages from the AP 100, and is able to transmit data and control messages to the AP 100. The AT 104 continually searches for other APs that could be added to the AT 104 active set. The active set comprises a list of the APs capable of communication with the AT 104. When such an AP is found, the AT 104 calculates a quality metric of the AP's forward link, which in one embodiment comprises a signal-to-interference and-noise ratio (SINR). In one embodiment, the AT 104 searches for other APs and determines the AP's SINR in accordance with a pilot signal. Simultaneously, the AT 104 calculates the forward link quality metric for each AP in the AT 104 active set. If the forward link quality metric from a particular AP is above a predetermined add threshold or below a predetermined drop threshold for a predetermined period of time, the AT 104 reports this information to the AP 100. Subsequent messages from the AP 100 direct the AT 104 to add to or to delete from the AT 104 active set the particular AP.

The AT 104 selects a serving AP from the active set based on a set of parameters. The term serving AP refers to an AP that a particular AT selected for data communication or an AP that is communicating data to the particular AT. The set of parameters can comprise present and previous SINR measurements, a bit-error-rate and/or a packet-error-rate, and other parameters known to one skilled in the art. In one embodiment, the serving AP is selected in accordance with the largest SINR measurement. The AT 104 then specifies the selected AP in a data request message (DRC message), transmitted on the data request channel (DRC channel). The DRC message can contain the requested data rate or, alternatively, an indication of the quality of the forward link, e.g., the measured SINR, the bit-error-rate, or the packet-error-rate. In one embodiment, the AT 104 can direct the transmission of the DRC message to a specific AP by the use of a Walsh code, which uniquely identifies the specific AP. The DRC message symbols are tensor-multiplied (shaped) with the unique Walsh code. The tensor-multiplication (shaping) operation is referred to as Walsh covering of a signal. Since each AP in the active set of the AT 104 is identified by a unique Walsh code, only the selected AP which correlates the DRC signal with the correct Walsh code can correctly decode the DRC message.

The data to be transmitted to the AT 104 arrives at the controller 110. In accordance with one embodiment, the controller 110 sends the data to all APs in AT 104 active set over the backhaul 112. In another embodiment, the controller 110 first determines, which AP was selected by the AT 104 as the serving AP, and then sends the data to the serving AP. The data is stored in a queue at the AP(s). A paging message is then sent by one or more APs to the AT 104 on respective control channels. The AT 104 demodulates and decodes the signals on one or more control channels to obtain the paging messages.

At each time-slot, the AP can schedule data transmission to any of the ATs that received the paging message. An exemplary method for scheduling transmission is described in U.S. Pat. No. 6,229,795, entitled "SYSTEM FOR ALLOCATING RESOURCES IN A COMMUNICATION SYSTEM," assigned to the assignee of the present invention. The AP uses the rate control information received from each AT in the DRC message to efficiently transmit forward link data at the highest possible rate. In one embodiment, the AP determines the data rate at which to transmit the data to the AT 104 based on the most recent value of the DRC message received from the AT 104. Additionally, the AP uniquely identifies a transmission to the AT 104 by using a spreading code which is unique to that mobile station. In the exemplary embodiment, this spreading code is the long pseudo noise (PN) code, which is defined by the IS-856 standard.

The AT 104, for which the data packet is intended, receives the data transmission and decodes the data packet. In one embodiment, each data packet is associated with an identifier, e.g. a sequence number, which is used by the AT 104 to detect either missed or duplicate transmissions. In such an event, the AT 104 communicates via the reverse link data channel the sequence numbers of the missing data units. The controller 110, which receives the data messages from the AT 104 via the AP communicating with the AT 104, then indicates to the AP what data units were not received by the AT 104. The AP then schedules a retransmission of such data units.

One skilled in the art recognizes that an AP can comprise one or more sectors. In the description above, the term AP was used generically to allow clear explanation of basic concepts of the HDR communication system. However, one skilled in the art can extend the explained concepts to an AP comprising any number of sectors. Consequently, the concept of sector will be used throughout the rest of the document.

Forward Link Structure

Figure 2:
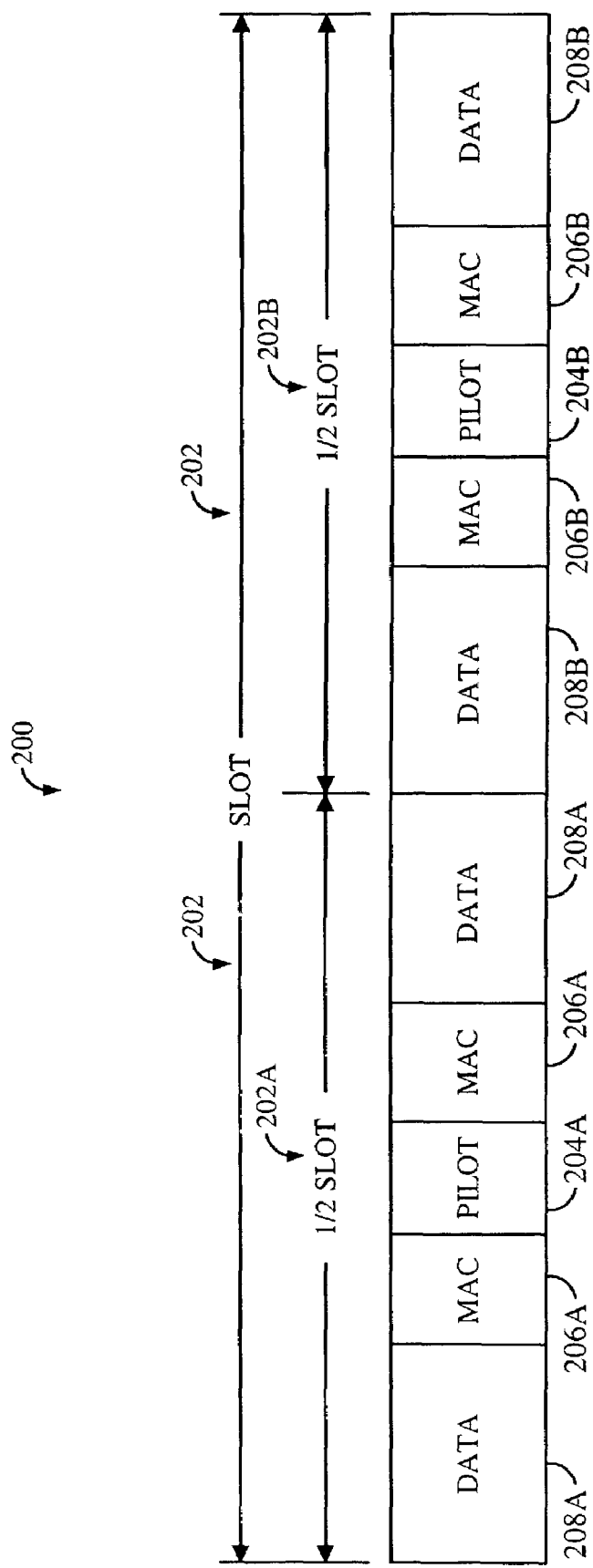
FIG. 2 illustrates an exemplary forward link waveform.

FIG. 2 illustrates an exemplary forward link waveform 200. For pedagogical reasons, the waveform 200 is modeled after a forward link waveform of the above-mentioned HDR system. However, one of ordinary skill in the art will understand that the teaching is applicable to different waveforms. Thus, for example, in one embodiment the waveform does not need to contain pilot signal bursts, and the pilot signal can be transmitted on a separate channel, which can be continuous or bursty. The forward link 200 is defined in terms of frames. A frame is a structure comprising 16 time-slots 202, each time-slot 202 being 2048 chips long, corresponding to a 1.66 ms. time-slot duration, and, consequently, a 26.66 ms. frame duration. Each time-slot 202 is divided into two half-time-slots 202A, 202B, with pilot bursts 204A, 204B transmitted within each half-time-slot 204A, 204B. In the exemplary embodiment, each pilot burst 204A, 204B is 96 chips long, and is centered at the midpoint of its associated half-time-slot 204A, 204B. The pilot bursts 204A, 204B comprise a pilot channel signal covered by a Walsh cover with index 0. A forward medium access control channel (MAC) 206 forms two bursts, which are transmitted immediately before and immediately after the pilot burst 204 of each half-time-slot 202. In the exemplary embodiment, the MAC is composed of up to 64 code channels, which are orthogonally covered by 64-ary Walsh codes. Each code channel is identified by a MAC index, which has a value between 1 and 64, and identifies a unique 64-ary Walsh cover. A reverse power control channel (RPC) is used to regulate the power of the reverse link signals for each subscriber station. The RPC commands are generated by comparing measured reverse link transmission power at the base station with a power control set point. If the measured reverse link transmission power is below the set point, then an RPC up command is provided to the subscriber station to increase the reverse link transmission power. If the measured reverse link transmission power is above the set point, then an RPC down command is provided to the subscriber station to decrease the reverse link transmission power. The RPC is assigned to one of the available MACs with MAC index between 5 and 63. The MAC with MAC index 4 is used for a reverse activity channel (RA), which performs flow control on the reverse traffic channel. The forward link traffic channel and control channel payload is sent in the remaining portions 208A of the first half-time-slot 202A and the remaining portions 208B of the second half-time-slot 202B.

Reverse Link Power Control

Unlike the forward link, whose channels are always transmitted at full available power, the reverse link comprises channels, whose transmission is power controlled, to achieve the goal of maximized capacity of the communication system as explained above. Consequently, aspects of the maximum rate of data estimation will be described in the context of the reverse link. However, as those of ordinary skill in the art will readily appreciate, these aspects are equally applicable to a forward link in a communication system, whose forward link is also power controlled.

Figure 3:
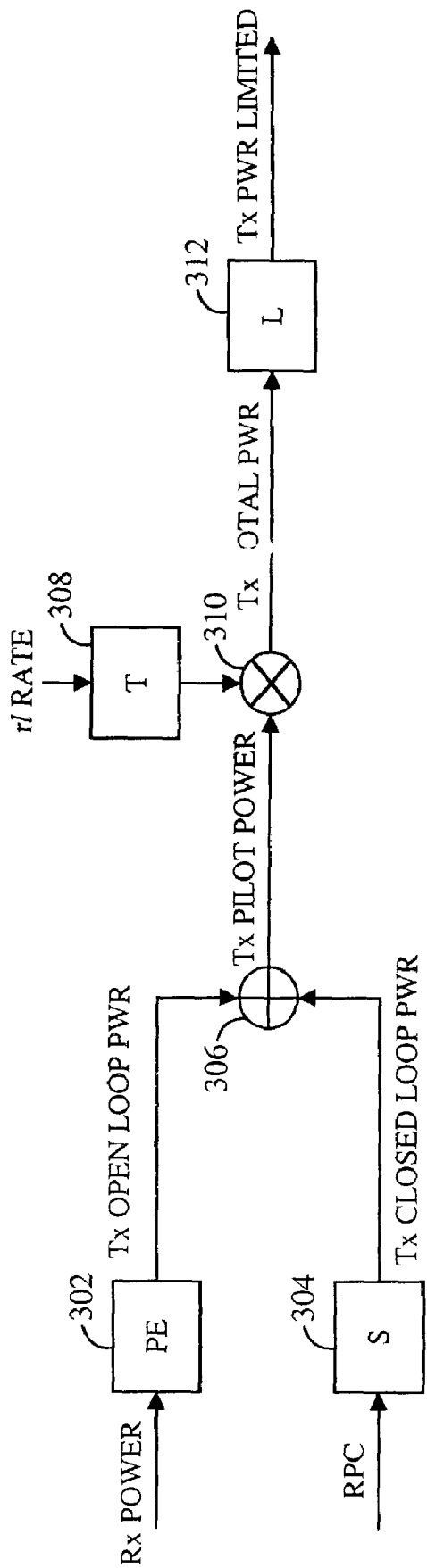
FIG. 3 illustrates a reverse link transmission power control.

The reverse link transmission power of the communication system in accordance with the IS-856 standard is controlled by two power control loops, an open loop and a closed loop. Conceptual arrangement of the open loop and closed loop is illustrated in FIG. 3. The first power control loop is an open loop control. The open loop generates an estimate of the reverse link quality metric in block 302. In one embodiment, the quality metric is a path loss. The estimated path loss is then translated into a required transmit power (TxOpenLoopPwr) in accordance with other factors, e.g., a base station loading. In one embodiment, illustrated in FIG. 4, block 302 (of FIG. 3) comprises a filter 402 filtering a received signal power RxPwr. The filtered RxPwr is provided to block 404 together with a parameter K providing compensation for base station loading and translation to the TxOpenLoopPwr. In one embodiment, the block 404 combines the filtered RxPwr and the parameter K in accordance with an Equation (1):

$$TxOpenLoopPwr = K - F(RxPwr) \quad (1)$$

where F is the transfer function of the filter 402.

In one embodiment, the received signal is a signal received on a pilot channel. One of ordinary skill in the art recognizes that other embodiments of an open loop estimation process are well known the art and are equally applicable.

Referring back to FIG. 3, the function of the closed loop is to correct the open loop estimate, which does not take into account environmentally induced phenomena, such as shadowing, and other user interferences, to achieve a desired signal quality at the base station. In one embodiment, the desired signal quality comprises a signal-to-noise ratio (SNR). The objective can be achieved by measuring the quality metric of a reverse link and reporting results of the measurement back to the subscriber station. In one embodiment, the base station measures a reference signal transmitted over the reverse link, and provides feedback to the subscriber station. The subscriber station adjusts the reverse link transmission power in accordance with the feedback signal. In one embodiment, the reference signal comprises a pilot SNR, and the feedback comprises the RPC commands, which are summed in a summer 304 and scaled to obtain the required closed loop transmit power (TxClosedLoopAdj). Like the open loop, the closed loop is well known in the art and other known embodiments are equally applicable, as recognized by one of ordinary skill in the art.

The TxOpenLoopPwr and the TxClosedLoopAdj are summed in a block 306 to yield TxPilotPwr. The value of the TxPilotPwr is, in general, different from the value of total transmit power required for transmission of a desired reverse link rate of data (rlRate). Consequently, the TxPilotPwr needs to be adjusted for the required rlRate. This is accomplished by translating the rlRate to a power in block 308, and combining the result of the translation with the TxPilotPwr in a block 310 to yield the total transmit power (TxTotalPwr). Consequently, the TxTotalPwr can be expressed by an Equation 2:

$$TxTotalPwr = TxOpenLoopPwr + TxClosedLoopAdj + PilotToTotalRatio(rlRate) \quad (2)$$

where the PilotToTotalRatio is a function describing a translation between the rate of data of a signal used for determining the TxOpenLoopPwr and the TxClosedLoopAdj and the rlRate.

Figure 5:
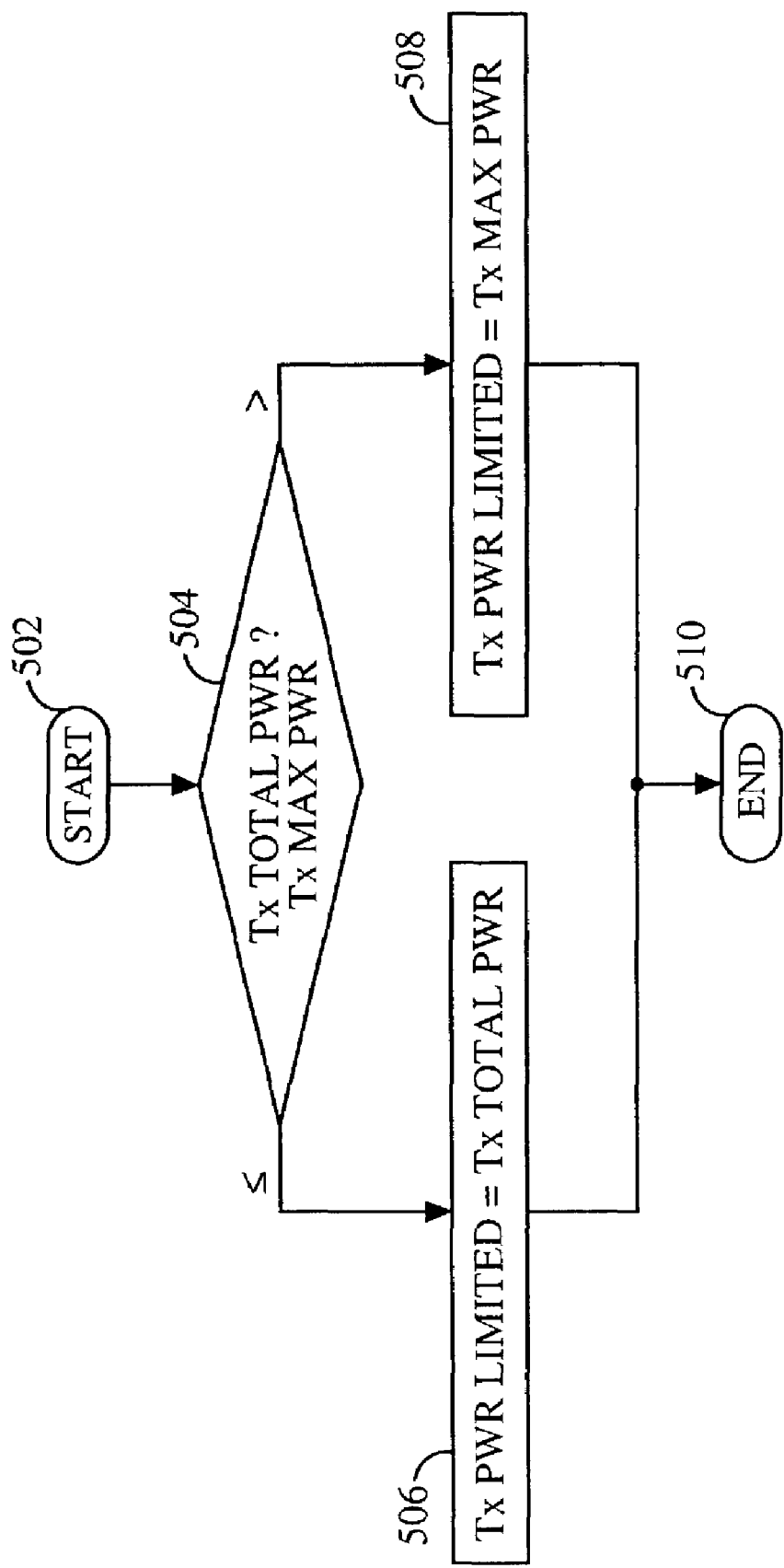
FIG. 5 illustrates a method for transmit power limiting.

Because a transmitter implementation has maximum allowable power (TxMaxPwr), the TxTotalPwr may be optionally limited in block 312. In one embodiment, the transmit power limiting is performed in accordance with a method illustrated in FIG. 5. The method starts in step 502 and continues in step 504. In step 504, the TxTotalPwr is compared to the TxMaxPwr. If the TxTotalPwr is less or equal to TxMaxPwr, the method continues in step 508, where the TxPwrLimited is set equal to TxMaxPwr; otherwise, the method continues in step 506, where the TxPwrLimited is set equal to TxTotalPwr. The method ends in step 510.

As follows from the above-described power control method if the TxTotalPwr is greater than the TxMaxPwr, the transmitted power is limited to the TxMaxPwr. Consequently, there is no assurance, that the data transmitted will be successfully received and decoded at the BS. Consequently, a maximum admissible rate of data estimator is included in the power control loop as described in the embodiments below.

Maximum Admissible Data Rate Estimation

Figure 6:
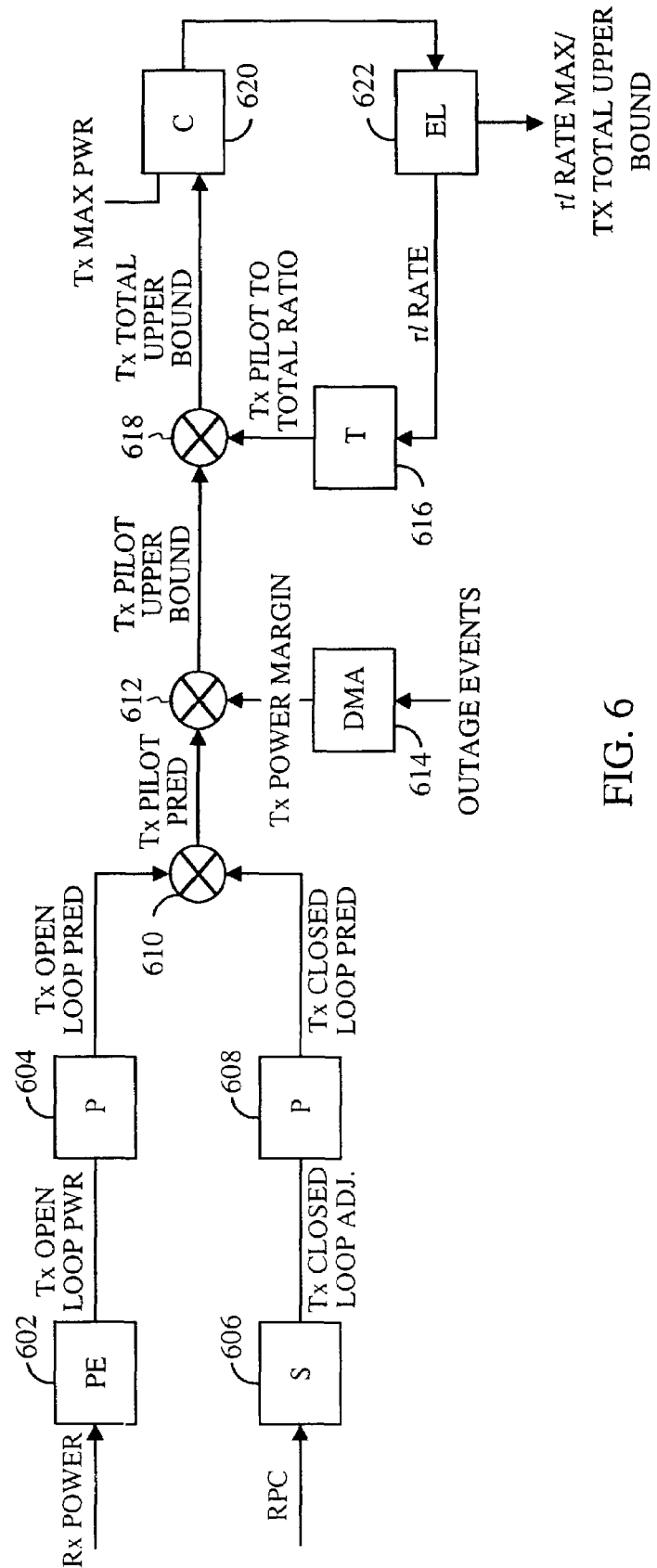
FIG. 6 illustrates a conceptual arrangement of an embodiment of reverse link maximum admissible data rate estimation.

FIG. 6 illustrates a conceptual arrangement of reverse link maximum admissible rate of data estimation. The open loop generates an estimate of the reverse link quality metric in block 602. In one embodiment, the quality metric is a path loss. The estimated path loss is then translated into a required transmit power TxOpenLoopPwr in accordance with other factors, e.g., a base station loading. In one embodiment, the TxOpenLoopPwr is estimated in accordance with FIG. 4. The TxOpenLoopPwr is provided to a block 604, which may predict the value of TxOpenLoopPwr at some time in the future. The predicted output of block 604 is denoted TxOpenLoopPred. In one embodiment, the block 604 is an identity function; consequently, the TxOpenLoopPwr is unaffected by the block 604, therefore, TxOpenLoopPred=TxOpenLoopPwr. Another embodiment of the block 604 is illustrated in FIG. 7.

As illustrated in FIG. 7, TxOpenLoopPwr is provided to a linear, time-invariant filter 702. In one embodiment, the filter 702 is a low pass filter. In another embodiment, the filter 702 has a transfer function $F_1=1$; consequently, the TxOpenLoopPwr is unaffected by the filter 702. The TxOpenLoopPwr filtered by a filter 702 is provided to a filter 704. In one embodiment, the filter 704 is a peak filter. The function of the peak filter is explained in reference to FIG. 8.

Figure 8:
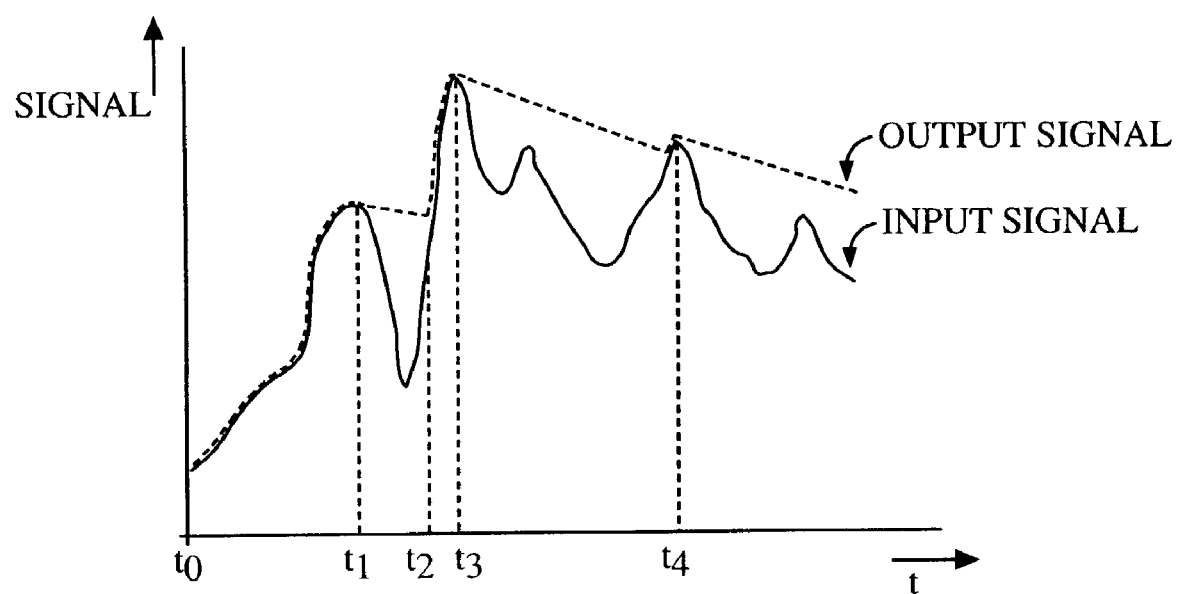
FIG. 8 illustrates a peak filter.

Referring to FIG. 8, at time $t_0$, the Input signal is provided to a peak filter. The value of the output of the peak filter Output signal is initialized to the value of Input signal. From time $t_0$ to time $t_1$, the Output signal tracks the Input signal. At time $t_1$, the Input signal reached a peak and started to decay. The Output signal stopped to follow the Input signal, and started to decay by a pre-determined rate. At time $t_2$, the Input signal became equal to the Output signal and continued to rise. Consequently, the Output signal stops decaying, and starts tracking the Input signal.

Referring back to FIG. 6, the TxOpenLoopPred is provided to a combiner block 610. In one embodiment the combiner block 610 comprises a summer summing the TxOpenLoopPred with a prediction of the closed loop adjustment (TxClosedLoopPred), to yield a prediction of transmit pilot power (TxPilotPred). The predicted closed loop adjustment TxClosedLoopPred is estimated by providing feedback signals for the closed loop to a block 606. In one embodiment, the feedback signal comprises the RPC commands; consequently, the block 606 comprises a summer. The output of the summer represents the estimate of correction to the open loop estimated transmit power (TxClosedLoopAdj). The TxClosedLoopAdj is provided to a block 608. In one embodiment, the block 608 comprises a filter as described in reference to FIG. 7, i.e., an optional low pass filter 702 and a (non-optional) peak filter 704. In accordance with one embodiment, the pre-determined decay rate of the peak filter 704 is 0.5 dB per a frame of signal. The peak filter is initialized as follows. One of the ATs and one of the APs establish a communication link using a predetermined access procedure, as part of which the RPC channel is established. Assuming that the RPC channel was established at time $t_0$ (referring to FIG. 8) the RPC commands are being provided to the block 608, and consequently to the peak filter 704. The TxClosedLoopPred (the Output signal of FIG. 8) is then initialized to the value of TxClosedLoopAdj (the Output signal of FIG. 8) at the time $t_0$.

Referring back to the block 610, the TxPilotPred is provided to a combiner block 612. Combiner block 612 also accepts a transmission power margin (TxPwrMargin). In one embodiment, (not shown) the TxPwrMargin is a constant, with default value of 3 dB. In another embodiment, the TxPwrMargin is dynamically adjusted by block 614, in accordance with outage events. The method for dynamically adjusting the TxPwrMargin is described in detail below. Referring back to the combiner block 612, in one embodiment, the combiner block 612 is a summer, consequently the output, a bounded transmission pilot signal (TxPilotUpperBound) is given by an Equation (3):

$$\text{TxPilotUpperBound} = \text{TxOpenLoopPred} + \text{TxClosedLoopPred} + \text{TxPwrMargin} \quad (3)$$

The value of the TxPilotPred is, in general, different from the value of total transmit power required for transmission of a desired reverse link rate of data (rlRate). Consequently, the TxPilotUpperBound needs to be adjusted for the required rlRate. This is accomplished by translating the rlRate to a power in block 616, and in combining the result of the translation with the TxPilotUpperBound in a block 618 to yield the bounded total transmit power. A given rlRate is considered to be admissible if an Equation (4) is satisfied:

$$\text{TxPilotUpperBound} + \text{PilotToTotalRatio}(\text{rlRate}) < \text{TxMaxPwr} \quad (4)$$

To optimize performance of a communication system, it is desired that the highest data rate (rlRatePredicted), which is admissible (according to the Equation(4) is determined. Consequently, the TxTotalPwrUpperBound is compared with the maximum power available for transmission (TxMaxPwr) in block 620. Thus, the block 620 evaluates the Equation (4). The result of the comparison is provided to a block 622. If the Equation (4) is satisfied, the block 622 selects rlRate higher than the rlRate that has just been tested, provides the selected rlRate to the block 616, and the process is repeated until the Equation (4) does not hold. The highest rate, for which the Equation (4) is satisfied is outputted as rlRatePredicted. One of ordinary skill in the art understands that the blocks 618–622 can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. For the purposes of this document any of the above-enumerated options is referred to collectively as a processing block.

Estimation of Power Required for Transmission of Data at a Rate of Data

Alternatively, the apparatus as illustrated in FIG. 6 may be utilized for estimating power required for transmission of data at a pre-determined rate. In such an embodiment, the pre-determined rlRate yields a value of TxTotalPowerUpperBound as described above. The TxTotalPwrUpperBound can be then outputted (not shown). Alternatively, the TxTotalPwrUpperBound may be compared with one or more thresholds, and the result may be used, for example, to control the state of the power amplifier, to improve the energy efficiency of the transmitter (communication device). Thus, the TxTotalPwrUpperBound is compared with the one or more thresholds in block 620. Thus, the block 620 evaluates the Equation (4). The result of the comparison is provided to a block 622. The block 620 provides an indication whether the Equation (4) is satisfied to block 622, which provides an appropriate output, e.g., the value of the pre-determined rlRate, the corresponding threshold and indication whether the Equation (4) is satisfied or not. If desired, the process is repeated for all available rlRates, and thresholds.

TxPwrMrg Dynamic Adjustment

Figure 9:
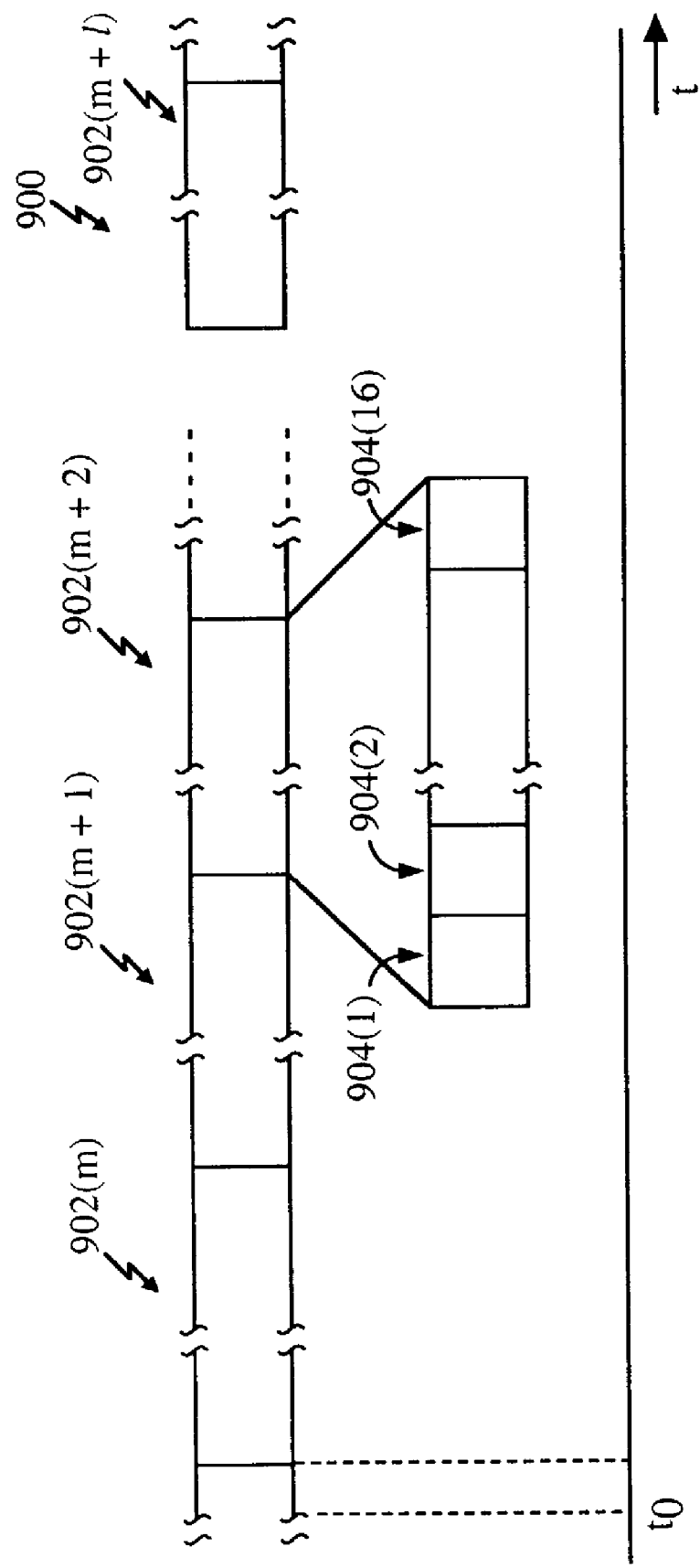
FIG. 9 illustrates an exemplary reverse link waveform.

As discussed, the reverse link channel comprises the Physical Layer Channels transmitted from the AT to the access network. FIG. 9 illustrates an exemplary reverse link waveform 900. For pedagogical reasons, the waveform 900 is modeled after a reverse link waveform of the above-mentioned system in accordance to IS-856 standard. However, one of ordinary skill in the art will understand that the teaching is applicable to different waveforms. The reverse link channel 900 is defined in terms of frames 902. A frame 902 is a structure comprising 16 time-slots 904($n$), each time-slot 904($n$) being 2048 chips long, corresponding to a 1.66 ms. time-slot duration, and, consequently, a 26.66 ms. frame duration.

In accordance with the IS-856 standard, the rate of data can change only at a frame boundary. In general, the value of rlRatePredicted will be determined several slots before the start of a frame, in order to arrive at the rate of data to be transmitted during that frame on the reverse link. Suppose the value of rlRatePredicted is determined at time $t_0$, k slots (k>0) before the start of a frame 902($m$) in accordance with the above-described embodiment. At the start of the frame 902($m$), the AT evaluates the transmit power requirement for the determined rlRatePredicted in accordance with the open loop and closed loop power control, and begins transmitting the data. During the frame duration, the transmit power is adjusted in accordance with an update of the open loop and closed loop power control. Consequently, the actual transmit power may differ from the transmit power TxTotalPowerUpperBound, corresponding to the determined rlRatePredicted. To evaluate the performance of the maximum admissible data rate estimation, the concept of outage can be utilized.

The $n^{th}$ slot of the 902($m^{th}$) frame is defined to be in outage of Type A if the power required for the rlRatePredicted at the $n^{th}$ slot is greater than the power determined for the rlRatePredicted at time $t_0$, i.e., if Equation (5) is satisfied:

$$\text{TxOpenLoop}[16m+n] + \text{TxClosedLoop}[16m+n] + \text{PilotToTotalRatio}(\text{rlRatePredicted}[16m-k]) > \text{TxMaxPwr} \quad (5)$$

If the nth slot of the 902($m^{th}$) frame is not in outage of Type A, then from Equations (4) and (5) follows:

$$\text{TxPilotPred}[16m+n]+\text{PilotToTotaRatio}(\text{rlRatePredicted}[16m-k]) \leq x\text{PwrMargin} \qquad (6)$$

The $n^{th}$ slot of the 902($m^{th}$) frame is defined to be in outage of Type B if the power required for the rlRatePredicted at the $n^{th}$ slot is greater than the power determined for the rlRatePredicted at time $t_0$, i.e., if Equation (7) is satisfied:

$$\text{TxPilotUpperBound}[16m+n] > \text{TxPilotUpperBound}[16m-k]n=0, 1, \ldots, 15 \qquad (7)$$

If the $n^{th}$ slot of the 902($m^{th}$) frame is not in outage of Type B, then from Equations (4) and (7) follows:

$$\text{TxPilotPred}[16m+n]+\text{PilotToTotalRatio}(\text{rlRatePredicted}[16m-k]) \leq \text{TxMaxPwr} \qquad (8)$$

Equations (6) and (8) show that if the value of rlRatePredicted determined at time $t_0$ is used for transmitting the data over the next frame 902($m$+1), then the reverse link is not power-limited during the $n^{th}$ slot of the frame 902($m$+1).

It has been discovered, that due to various methods for mitigating changing channel conditions, e.g., error correction, interleaving and other methods known to one of ordinary skill in the art, isolated slot outages in a frame do not result in packet decoding errors, however too many slot outages in one frame result in packet decoding errors. A design goal of a communication system is to limit the slot outage probability, to guarantee minimal performance degradation due to packet errors, while maximizing reverse link throughput under all channel conditions. From Equations (3), (4), (6) and (8) increasing TxPwrMargin may reduce outage probability, while reducing TxPwrMargin increases the predicted reverse link data rate. In other words, a large value of TxPwrMargin provides a conservative estimate of the predicted reverse link data rate, resulting in lower user throughput and possibly, diminished reverse link capacity. Therefore, in another embodiment, the value of TxPwrMargin is dynamically adjusted in accordance with changing channel conditions in order to maintain outage probability at the desired value.

In one embodiment, dynamically adjusting the TxPwrMargin, involves evaluating an occurrence of an outage for each slot of the frame 902($m$+1). If a slot outage occurs, the TxPwrMargin is incremented by PwrMarginUpStep; otherwise, the TxPwrMargin is decremented by PwrMarginDownStep. In one embodiment, the PwrMarginUpStep=0.5 dB, the PwrMarginUpStep=0.05 dB. The value of TxPwrMargin is further limited between TxPwrMarginMin and TxPwrMarginMax. In one embodiment, the TxPwrMarginMin=0 dB and TxPwrMarginMax=6 dB In another embodiment, if a frame has j slot outages, 0<=j<=16, TxPwrMargin is incremented by TxPowerMarginStep[j], where TxPowerMarginStep[j] is an array of length 16. Note that several elements of the array TxPowerMarginStep[j] can be zeros to allow for the above-mentioned consideration that few, isolated slot outages in a frame do not result in packet decoding errors. The value of TxPwrMargin is further limited between TxPwrMarginMin and TxPwrMarginMax.

Ratchet Mode

Additionally, when the Type A outage is used for dynamic adjustment of the TxPwrMargin, a special update mode—a ratchet mode—is entered if the determined rlRatePredicted changes from a lower value to a maximum allowable rate of data value (rlRateMaxAllowable), or if the determined rlRatePredicted changes from a higher value to a minimum rate of data (rlRateMinAllowable).

If the determined rlRatePredicted changes from a lower value to the rlRateMaxAllowable, the lower bound of the power margin (TxPwrMarginLow) is set equal to the current value of TxPwrMargin. If a slot outage occurs, the TxPwrMargin is incremented by PwrMarginUpStep. If no slot outage occurs, an Equation (9) is evaluated:

$$\text{TxPwrMargin} - \text{PwrMarginDownStep} >= \text{TxPwrMarginLow} \qquad (9)$$

If the Equation (9) is satisfied, the TxPwrMargin is decremented by PwrMarginDownStep; otherwise, the TxPwrMargin is set equal to TxPwrMarginLow. When the determined rlRatePredicted changes from the maximum allowable rate of data value to a lower value, the TxPwrMarginLow is set to TxPwrMarginMin. The ratchet mode is exited when the determined rlRatePredicted drops below the rlRateMaxAllowable.

If the determined rlRatePredicted changes from a higher value to the rlRateMinAllowable, upper bound of the power margin (TxPwrMarginUpper) is set equal to the current value of TxPwrMargin. If a slot outage occurs, an Equation (10) is evaluated:

$$\text{TxPwrMargin} + \text{PwrMarginUpStep} >= \text{TxPwrMarginUpper} \qquad (10)$$

If the Equation (10) is satisfied, the TxPwrMargin is not changed; otherwise the TxPwrMargin is incremented by PwrMarginUpStep. If a no slot outage occurs the TxPwrMargin is decremented by PwrMarginDownStep. The ratchet mode is exited when the determined rlRatePredicted exceeds the rlRateMinAllowable.

In another embodiment of the ratchet mode, if rlRatePredicted equals rlRateMaxAllowable, and a slot outage does not occur, then TxPwrMargin is not changed from the current value, if a slot outage occurs, the TxPwrMargin is incremented by a PwrMarginUpStep. If rlRatePredicted equals rlRateMinAllowable, and a slot outage occurs, TxPwrMargin is not changed from the current value, if a slot outage does not occur, the TxPwrMargin is decremented by a PwrMarginDownStep.

Figure 11:
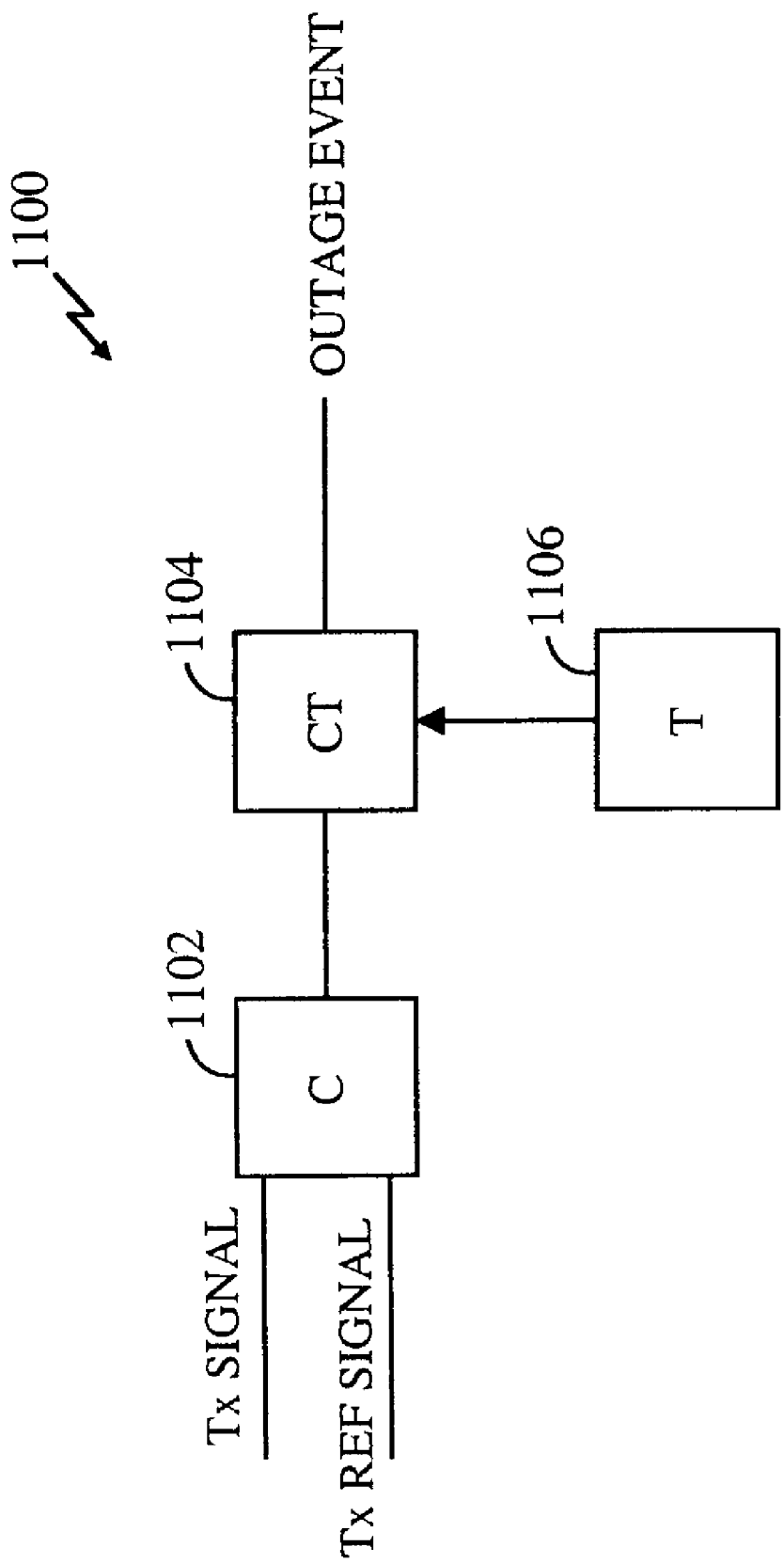
FIG. 11 illustrates an outage event detector in accordance with one embodiment.

FIG. 11 illustrates an outage event detector 1100, in accordance with one embodiment. The transmission power of a signal whose outage is to be determined (TxSignal) is provided to a block 1102, together with the reference signal (TxRefSignal). The block 1102 provides an output when TxSignal is greater than TxRefSignal. In one embodiment, the block 1102 comprises a comparator. The output of the block 1102 is provided to a block 1104. The block 1104 is further provided with a timing signal from block 1106. Block 1104 outputs a signal providing information of the number of occurrences of TxSignal being greater than TxRefSignal.

Those of ordinary skill in the art will recognize that although the various embodiments were described in terms of power control being performed by both an open loop and a closed loop, such was done for pedagogical purposes only. Clearly, any mechanism that allows an AT to estimate a quality metric of a reverse link over which the AT transmits data is sufficient. Therefore, should an AT use only an open loop, or only a closed loop, the embodiments would be equally applicable. Thus, referring to FIG. 6, if only an open loop were implemented, (i.e., blocks 606 and 608 were deleted) form FIG. 6, the embodiments are valid, realizing that:

$$TxOpenLoopPwr = TxPilotPwr \quad (11)$$

Figure 10:
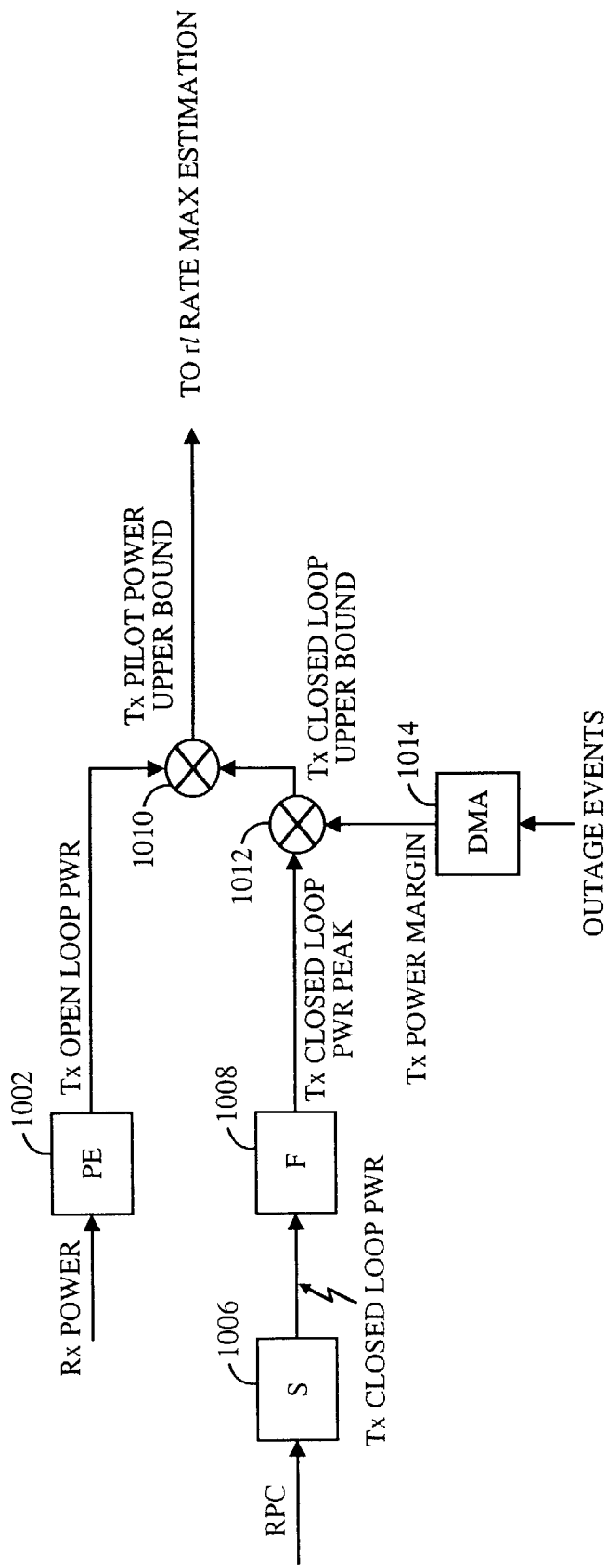
FIG. 10 illustrates arrangement of another embodiment of reverse link maximum admissible data rate estimation.

Furthermore, in a specific case, when path loss changes slowly the embodiment described in reference to FIG. 6 can be further simplified as illustrated in FIG. 10, where the function of blocks 1002, 1006, 1008, 1010, and 1012 is the same as function of blocks 602, 606, 608, 610, and 612. One of ordinary skill in the art will recognize that moving the block 1012 to the closed loop branch does not change determination of TxPilotPredUpperBound because Equation (3) holds.

Those of ordinary skill in the art will recognize that although the various embodiments were described in terms of flowcharts and methods, such was done for pedagogical purposes only. The methods can be performed by an apparatus, which in one embodiment comprises a processor interfaced with a transmitter and a receiver or other appropriate blocks at the AT and/or AP.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for estimating a reverse link maximum data rate, comprising:
    determining at a source of data a quality metric of a link over which data is to be transmitted wherein the quality metric is determined by:
    generating an open loop estimate of the quality metric;
    generating a closed loop estimate of the quality metric;
    filtering the open loop estimate using a first filtering method;
    filtering the closed loop estimate using a second filtering method; and
    summing the filtered open loop estimate and the filtered closed loop estimate;
    modifying the quality metric by a transmission power margin; and
    determining a maximum rate of data in accordance with the modified quality metric.

2. The method as claimed in claim 1, wherein the first filtering method comprises:
    filtering said quality metric by a linear filter.

3. The method as claimed in claim 1, wherein the first filtering method comprises:
    filtering said quality metric by a non-linear filter.

4. The method as claimed in claim 3, wherein said filtering the quality metric by a non-linear filter comprises:
    filtering said quality metric by a peak filter.

5. The method as claimed in claim 1, wherein determining at a source of data a quality metric of a link over which data is to be transmitted comprises:
    receiving at a source of data at least one first reference signal; and
    determining the quality metric in accordance with the received at least one first reference signal.

6. The method as claimed in claim 1, wherein determining at a source of data a quality metric of a link over which data is to be transmitted comprises:
    receiving at a source of data a feedback signal; and
    determining the quality metric in accordance with the received feedback signal.

7. The method as claimed in claim 1, wherein determining at a source of data a quality metric of a link over which data is to be transmitted comprises:
receiving at a source of data at least one signal;
receiving at a source of data a feedback signal; and
determining the quality metric in accordance with the received at least one signal and the received feedback signal.

8. The method as claimed in claim 1, wherein determining at a source of data a quality metric of a link over which data is to be transmitted comprises:
receiving at a source of data a reference signal;
receiving at a source of data a feedback signal; and
determining the quality metric in accordance with the reference signal, the received reference signal, and the received feedback signal.

9. The method as claimed in claim 1, wherein modifying the quality metric by a transmission power margin comprises:
declaring an outage event when power required for transmission of a second reference signal exceeds power required for transmission of the second reference signal determined from previously modified quality metric;
detecting occurrence of the outage event during a pre-determined interval; and
modifying the quality metric in accordance with the detecting.

10. The method as claimed in claim 9, wherein modifying the quality metric in accordance with the detecting comprises:
increasing a current transmission power margin by a first amount when a pre-determined number of the outage events occurred during the pre-determined interval; and
modifying the quality metric by the increased transmission power margin.

11. The method as claimed in claim 10, further comprising:
decreasing a current transmission power margin by a second amount when the pre-determined number of the outage events did not occur during the pre-determined interval; and
modifying the quality metric by the decreased transmission power margin.

12. The method as claimed in claim 1, wherein modifying the quality metric by a transmission power margin comprises:
declaring an outage event when power required for transmission of data at the estimated rate of data exceeds maximum allowable transmission power;
detecting occurrence of the outage event during a pre-determined interval; and
modifying the quality metric in accordance with the detecting.

13. The method as claimed in claim 12, wherein modifying the quality metric in accordance with the detecting comprises:
increasing a current transmission power margin by a first amount when a pre-determined number of outages occurred during the pre-determined interval; and
modifying the quality metric by the increased transmission power margin.

14. The method as claimed in claim 13, further comprising:
decreasing a current transmission power margin by a second amount when the pre-determined number of outages did not occur during the pre-determined interval; and
modifying the quality metric by the decreased transmission power margin.

15. The method as claimed in claim 13, wherein increasing a current transmission power margin by a first amount when a pre-determined number of outages occurred during the pre-determined interval comprises:
determining whether the estimated rate of data has changed to a maximum allowable rate of data;
setting a quality metric lower limit to the current value of the quality metric; and
increasing the quality metric by a first value when a pre-determined number of outages occurred during the pre-determined interval.

16. The method as claimed in claim 15, further comprising:
decreasing the power margin by a second value if the resulting decreased power margin is greater that the lower limit of the power margin; and
setting the power margin equal to the lower limit of the power margin otherwise.

17. The method as claimed in claim 14, wherein the decreasing a current transmission power margin by a second amount when the pre-determined number of outages did not occur during the pre-determined interval; comprises:
determining whether the estimated rate of data is equal to a minimum allowable rate of data;
setting a quality metric upper limit to the current value of the quality metric; and
decreasing the quality metric by a first value when a pre-determined number of outages occurred during the pre-determined interval.

18. The method as claimed in claim 17, further comprising:
increasing the power margin by a second value if the resulting increased power margin is less that the lower limit of the power margin; and
setting the power margin equal to the lower limit of the power margin otherwise.

19. The method as claimed in claim 13, wherein increasing a current transmission power margin by a first amount when a pre-determined number of outages occurred during the pre-determined interval comprises:
determining whether the estimated rate of data is equal to a maximum allowable rate of data; and
increasing the quality metric by a first value when a pre-determined number of outages occurred during the pre-determined interval.

20. The method as claimed in claim 19, further comprising:
unchanging the power margin when a pre-determined number of outages did not occur during the pre-determined interval.

21. The method as claimed in claim 13, wherein decreasing a current transmission power margin by a second amount when the pre-determined number of outages did not occur during the pre-determined interval; comprises:
determining whether the estimated rate of data is equal to a minimum allowable rate of data; and
decreasing the quality metric by a value when a pre-determined number of outages did not occur during the pre-determined interval.

22. The method as claimed in claim 17, further comprising:
leaving the power margin unchanged when a pre-determined number of outages occurred during the pre-determined interval.

23. The method as claimed in claim 1, wherein determining a maximum rate of data in accordance with the modified quality metric comprises:
  determining a transmission power in accordance with the modified quality metric; and
  selecting a data rate whose the determined transmission power does not exceed maximum allowable transmission power.

24. The method as claimed in claim 1, wherein the second filtering method comprises:
  filtering said quality metric by a linear filter.

25. The method as claimed in claim 1, wherein the second filtering method comprises:
  filtering said quality metric by a non-linear filter.

26. The method as claimed in claim 25, wherein said filtering the quality metric by a non-linear filter comprises:
  filtering said quality metric by a peak filter.

27. An apparatus for estimating a reverse link maximum data rate, comprising:
  means for determining at a source of data a quality metric of a link over which data is to be transmitted, wherein the means for determining the quality metric comprises:
    means for generating an open loop estimate of a first quality metric;
    means for generating a closed loop estimate of a second quality metric;
    means for filtering the open loop estimate using a first filtering means;
    means for filtering the closed loop estimate using a second filtering means; and
    means for summing the filtered open loop estimate and the filtered closed loop estimate;
  means for modifying the quality metric by a transmission power margin; and
  means for determining a maximum rate of data in accordance with the modified quality metric.

28. The apparatus as claimed in claim 27, wherein the first filtering means comprises:
  means for filtering the quality metric by a linear filter.

29. The apparatus as claimed in claim 27, wherein the second filtering means comprises:
  means for filtering the quality metric by a non-linear filter.

30. The apparatus as claimed in claim 29, wherein the means for filtering the quality metric by a non-linear filter comprises:
  means for filtering the quality metric by a peak filter.

31. The apparatus as claimed in claim 27, wherein the means for determining at a source of data a quality metric of a link over which data is to be transmitted comprises:
  means for receiving at a source of data at least one signal; and
  means for determining the quality metric in accordance with the received at least one signal.

32. The apparatus as claimed in claim 27, wherein the means for determining at a source of data a quality metric of a link over which data is to be transmitted comprises:
  means for receiving at a source of data at least one first reference signal; and
  means for determining the quality metric in accordance with the received at least one first reference signal.

33. The apparatus as claimed in claim 27, wherein the means for determining at a source of data a quality metric of a link over which data is to be transmitted comprises:
  means for receiving at a source of data a feedback signal; and
  means for determining the quality metric in accordance with the received feedback signal.

34. The apparatus as claimed in claim 27, wherein the means for determining at a source of data a quality metric of a link over which data is to be transmitted comprises:
  means for receiving at a source of data at least one signal;
  means for receiving at a source of data a feedback signal; and
  means for determining the quality metric in accordance with the received at least one signal and the received feedback signal.

35. The apparatus as claimed in claim 27, wherein the means for determining at a source of data a quality metric of a link over which data is to be transmitted comprises:
  means for receiving at a source of data a first reference signal;
  means for receiving at a source of data a feedback signal; and
  means for determining the quality metric in accordance with the first reference signal, the received first reference signal, and the received feedback signal.

36. The apparatus as claimed in claim 27, wherein the means for modifying the quality metric by a transmission power margin comprises:
  means for modifying the quality metric by a pre-determined transmission power margin.

37. The apparatus as claimed in claim 27, wherein the means for modifying the quality metric by a transmission power margin comprises:
  means for declaring an outage event when power required for transmission of a second reference signal exceeds power required for transmission of the second reference signal determined form previously modified quality metric;
  means for detecting occurrence of the outage event during a pre-determined interval; and
  means for modifying the quality metric in accordance with the detecting.

38. The apparatus as claimed in claim 37, wherein the means for modifying the quality metric in accordance with the detecting comprises:
  means for increasing a current transmission power margin by a first amount when a pre-determined number of the outage events occurred during the pre-determined interval; and
  means for modifying the quality metric by the increased transmission power margin.

39. The apparatus as claimed in claim 38, further comprising:
  means for decreasing a current transmission power margin by a second amount when the pre-determined number of the outage events did not occur during the pre-determined interval; and
  means for modifying the quality metric by the decreased transmission power margin.

40. The apparatus as claimed in claim 27, wherein the means for modifying the quality metric by a transmission power margin comprises:
  means for declaring an outage event when power required for transmission of data at the estimated rate of data exceeds maximum allowable transmission power;
  means for detecting occurrence of the outage event during a pre-determined interval; and
  means for modifying the quality metric in accordance with the detecting.

41. The apparatus as claimed in claim 40, wherein the means for modifying the quality metric in accordance with the detecting comprises:
    means for increasing a current transmission power margin by a first amount when a pre-determined number of outages occurred during the pre-determined interval; and
    means for modifying the quality metric by the increased transmission power margin.

42. The apparatus as claimed in claim 41, further comprising:
    means for decreasing a current transmission power margin by a second amount when the pre-determined number of outages did not occur during the pre-determined interval; and
    means for modifying the quality metric by the decreased transmission power margin.

43. The apparatus as claimed in claim 41, wherein the means for increasing a current transmission power margin by a first amount when a pre-determined number of outages occurred during the pre-determined interval comprises:
    means for determining whether the estimated rate of data has changed to a maximum allowable rate of data;
    means for setting a quality metric lower limit to the current value of the quality metric; and
    means for increasing the quality metric by a first value when a pre-determined number of outages occurred during the pre-determined interval.

44. The apparatus as claimed in claim 43, further comprising:
    means for decreasing the power margin by a second value if the resulting decreased power margin is greater that the lower limit of the power margin; and
    means for setting the power margin equal to the lower limit of the power margin otherwise.

45. The apparatus as claimed in claim 42, wherein the means for decreasing a current transmission power margin by a second amount when the predetermined number of outages did not occur during the pre-determined interval; comprises:
    means for determining whether the estimated rate of data has changed to a minimum allowable rate of data;
    means for setting a quality metric upper limit to the current value of the quality metric; and
    means for decreasing the quality metric by a first value when a pre-determined number of outages occurred during the pre-determined interval.

46. The apparatus as claimed in claim 45, further comprising:
    means for increasing the power margin by a second value if the resulting increased power margin is less that the lower limit of the power margin; and
    means for setting the power margin equal to the lower limit of the power margin otherwise.

47. The apparatus as claimed in claim 41, wherein the means for increasing a current transmission power margin by a first amount when a pre-determined number of outages occurred during the pre-determined interval comprises:
    means for determining whether the estimated rate of data is equal to a maximum allowable rate of data; and
    means for increasing the quality metric by a first value when a pre-determined number of outages occurred during the pre-determined interval.

48. The apparatus as claimed in claim 47, further comprising:
    means for leaving the power margin unchanged when a pre-determined number of outages did not occur during the pre-determined interval.

49. The apparatus as claimed in claim 42, wherein the means for decreasing a current transmission power margin by a second amount when the pre-determined number of outages did not occur during the pre-determined interval; comprises:
    means for determining whether the estimated rate of data is equal to a minimum allowable rate of data; and
    means for decreasing the quality metric by a value when a pre-determined number of outages did not occur during the pre-determined interval.

50. The apparatus as claimed in claim 49, further comprising:
    means for leaving the power margin unchanged when a pre-determined number of outages occurred during the pre-determined interval.

51. The apparatus as claimed in claim 27, wherein the means for determining a maximum rate of data in accordance with the modified quality metric comprises:
    means for determining a transmission power in accordance with the modified quality metric; and
    means for selecting a data rate whose the determined transmission power does not exceed maximum allowable transmission power.

52. The apparatus as claimed in claim 27, wherein the first filtering means comprises:
    means for filtering the quality metric by a linear filter.

53. The apparatus as claimed in claim 27, wherein the second filtering means comprises:
    means for filtering the quality metric by a non-linear filter.

54. The apparatus as claimed in claim 53, wherein the means for filtering the quality metric by a non-linear filter comprises:
    means for filtering the quality metric by a peak filter.

* * * * *